United States Patent
Zhao et al.

(10) Patent No.: US 11,621,550 B2
(45) Date of Patent: Apr. 4, 2023

(54) OVERCURRENT PROTECTION CIRCUIT, OVERCURRENT PROTECTION METHOD, CLOCK SIGNAL GENERATION CIRCUIT AND DISPLAY DEVICE

(71) Applicants: Beijing ESWIN Computing Technology Co., Ltd., Beijing (CN); Hefei ESWIN IC Technology Co., Ltd., Hefei (CN)

(72) Inventors: Xinjiang Zhao, Beijing (CN); Yonghua Zhou, Beijing (CN)

(73) Assignees: Beijing ESWIN Computing Technology Co., Ltd., Beijing (CN); Hefei ESWIN IC Technology Co., Ltd., Hefei (CN)

( * ) Notice: Subject to any disclaimer, the term of this patent is extended or adjusted under 35 U.S.C. 154(b) by 141 days.

(21) Appl. No.: 17/420,991

(22) PCT Filed: May 7, 2021

(86) PCT No.: PCT/CN2021/092102
§ 371 (c)(1),
(2) Date: Jul. 6, 2021

(87) PCT Pub. No.: WO2022/095388
PCT Pub. Date: May 12, 2022

(65) Prior Publication Data
US 2022/0416531 A1 Dec. 29, 2022

(30) Foreign Application Priority Data
Nov. 6, 2020 (CN) .......................... 202011230235.1

(51) Int. Cl.
*H02H 3/093* (2006.01)
*G05F 1/573* (2006.01)
*H02H 3/08* (2006.01)

(52) U.S. Cl.
CPC ............. *H02H 3/093* (2013.01); *G05F 1/573* (2013.01); *H02H 3/08* (2013.01)

(58) Field of Classification Search
CPC ........... H02H 3/08; H02H 3/093; G05F 1/573
See application file for complete search history.

(56) References Cited

U.S. PATENT DOCUMENTS

2012/0140370 A1* 6/2012 Chen ...................... H02H 3/093
361/87
2015/0194800 A1* 7/2015 Kim ...................... G09G 3/3677
361/95
(Continued)

FOREIGN PATENT DOCUMENTS

CN 202444242 U 9/2012
CN 105223713 A 1/2016
(Continued)

OTHER PUBLICATIONS

Written Opinion of the International Search Authority corresponding to International Application No. PCT/CN2021/092102, dated Jul. 8, 2021 (9 pages).
(Continued)

*Primary Examiner* — Gary A Nash
(74) *Attorney, Agent, or Firm* — Maginot, Moore & Beck LLP (57) ABSTRACT

The present disclosure provides an overcurrent protection circuit, an overcurrent protection method, a clock signal generation circuit and a display device. The overcurrent protection circuit includes N first overcurrent detection circuits, N second overcurrent detection circuits, a first signal generation circuit, a second signal generation circuit, a first level switching circuit, a second level switching circuit and a control circuit. The first signal generation circuit is configured to output a first control signal to the first level switching circuit upon the receipt of a first overcurrent indication signal. The second signal generation circuit is configured to output a second control signal to the second level switching circuit upon the receipt of a second overcurrent indication signal. The control circuit is configured to provide an OFF control signal to an $n^{th}$ output control
(Continued)

module after a predetermined time period upon the receipt of a third control signal and/or a fourth control signal, where N is a positive integer, and n is a positive integer smaller than or equal to N.

20 Claims, 3 Drawing Sheets

(56) References Cited

U.S. PATENT DOCUMENTS

| | | |
|---|---|---|
| 2017/0261800 A1 | 9/2017 | Zhang et al. |
| 2018/0097350 A1* | 4/2018 | Zhang .................... G02F 1/1333 |
| 2019/0148928 A1* | 5/2019 | Oms .................... H02H 1/0015 |
| | | 324/503 |
| 2019/0199087 A1* | 6/2019 | Xiong .................... H02H 3/093 |
| 2019/0238123 A1 | 8/2019 | Yamanaka |

FOREIGN PATENT DOCUMENTS

| | | |
|---|---|---|
| CN | 110098597 A | 8/2019 |
| CN | 110829804 A | 2/2020 |
| CN | 112260216 A | 1/2021 |

OTHER PUBLICATIONS

Machine Translation of Written Opinion of the International Search Authority corresponding to International Application No. PCT/CN2021/092102, dated Jul. 8, 2021 (2 pages).

\* cited by examiner

OVERCURRENT PROTECTION CIRCUIT, OVERCURRENT PROTECTION METHOD, CLOCK SIGNAL GENERATION CIRCUIT AND DISPLAY DEVICE

CROSS-REFERENCE TO RELATED APPLICATION

The present application is a U.S. national phase of PCT Application No. PCT/CN2021/092102 filed on May 7, 2021, which claims priority to Chinese patent application No. 202011230235.1 filed on Nov. 6, 2020, both of which are incorporated herein by reference in their entirety.

TECHNICAL FIELD

The present disclosure relates to the field of overcurrent protection technology, in particular to an overcurrent protection circuit, an overcurrent protection method, a clock signal generation circuit and a display device.

BACKGROUND

In a gate driving circuit of a display device, several clock signal generation circuits need to be provided to convert a low voltage clock signal into a high voltage clock signal, so as to supply power to a gate electrode of a transistor. In order to prevent the occurrence of a chip failure due to a short circuit for the clock signal generation circuit, overcurrent protection needs to be provided to turn off an output power tube during the protection. In the related art, when the overcurrent protection is performed on the clock signal generation circuit, a large quantity of level switching circuits need to be adopted, so it is adverse to space-saving.

SUMMARY

A main object of the present disclosure is to provide an overcurrent protection circuit, an overcurrent protection method, a clock signal generation circuit and a display device, so as to solve the problem in the related art where it is adverse to space-saving due to a large quantity of level switching circuits for the overcurrent protection on the clock signal generation circuit.

In a first aspect, the present disclosure provides in some embodiments an overcurrent protection circuit for a clock signal generation circuit. The clock signal generation circuit includes N clock signal generation units, and N is a positive integer. An $n^{th}$ clock signal generation unit includes an $n^{th}$ clock signal output end, an $n^{th}$ output control module, an $n^{th}$ first output control end, an $n^{th}$ first output module, an $n^{th}$ second output control end and an $n^{th}$ second output module, the $n^{th}$ output control module is configured to provide an $n^{th}$ first output control signal to the $n^{th}$ first output control end and provide an $n^{th}$ second output control signal to the $n^{th}$ second output control end, the $n^{th}$ first output module is configured to control whether to output a first voltage signal through the $n^{th}$ clock signal output end under the control of the $n^{th}$ first output control signal, the $n^{th}$ second output module is configured to control whether to output a second voltage signal through the $n^{th}$ clock signal output end under the control of the $n^{th}$ second output control signal, and n is a positive integer smaller than or equal to N. The overcurrent protection circuit includes N first overcurrent detection circuits, N second overcurrent detection circuits, a first signal generation circuit, a second signal generation circuit, a first level switching circuit, a second level switching circuit and a control circuit. An $n^{th}$ first overcurrent detection circuit is configured to provide a first overcurrent indication signal to the first signal generation circuit through an output end of the $n^{th}$ first overcurrent detection circuit when an output current of the $n^{th}$ first output module is substantially greater than a predetermined current. An $n^{th}$ second overcurrent detection circuit is configured to provide a second overcurrent indication signal to the second signal generation circuit through an output end of the $n^{th}$ second overcurrent detection circuit when an output current of the $n^{th}$ second output module is substantially greater than the predetermined current. The first signal generation circuit is configured to output a first control signal to the first level switching circuit through an output end of the first signal generation circuit upon the receipt of the first overcurrent indication signal. The second signal generation circuit is configured to output a second control signal to the second level switching circuit through an output end of the second signal generation circuit upon the receipt of the second overcurrent indication signal. The first level switching circuit is configured to switch a level of the first control signal to acquire a third control signal, and provide the third control signal to the control circuit. The second level switching circuit is configured to switch a level of the second control signal to acquire a fourth control signal, and provide the fourth control signal to the control circuit. The control circuit is configured to provide an OFF control signal to the $n^{th}$ output control module within a predetermined time period ever since the receipt of the third control signal and/or the fourth control signal. The $n^{th}$ output control module is configured to control the $n^{th}$ first output module to stop the output of the first voltage signal through the $n^{th}$ clock signal output end and control the $n^{th}$ second output module to stop the output of the second voltage signal through the $n^{th}$ clock signal output end upon the receipt of the OFF control signal.

In some possible embodiments of the present disclosure, the control circuit is further configured to provide a normal operation control signal to the $n^{th}$ output control module after a predetermined time period upon the receipt of the third control signal and/or the fourth control signal, and the $n^{th}$ output control module is further configured to, upon the receipt of the normal operation control signal, provide the $n^{th}$ first output control signal to the $n^{th}$ first output module and provide the $n^{th}$ second output control signal to the $n^{th}$ second output module under the control of an input clock signal from an input clock signal end.

In some possible embodiments of the present disclosure, the control circuit includes a first OR gate, a Resetting/Setting (RS) trigger and a timer. A first input end of the first OR gate is configured to receive the third control signal, a second input end of the first OR gate is configured to receive the fourth control signal, and an output end of the first OR gate is electrically connected to a setting end of the RS trigger. A positive-phase output end of the RS trigger is electrically connected to the $n^{th}$ output control module. The timer is electrically connected to the positive-phase output end, and configured to be started when the OFF control signal is outputted by the positive-phase output end, and provide a resetting signal to a resetting end of the RS trigger after a predetermined time period, so as to enable the RS trigger to provide the normal operation control signal through the positive-phase output end.

In some possible embodiments of the present disclosure, the first signal generation circuit includes a second OR gate, the second OR gate includes N input ends, an $n^{th}$ input end of the second OR gate is electrically connected to the output end of the $n^{th}$ first overcurrent detection circuit, and an output end of the second OR gate is electrically connected to the output end of the first signal generation circuit.

In some possible embodiments of the present disclosure, the second signal generation circuit includes a third OR gate, the third OR gate includes N input ends, an $n^{th}$ input end of the third OR gate is electrically connected to the output end of the $n^{th}$ second overcurrent detection circuit, and an output end of the third OR gate is electrically connected to the output end of the second signal generation circuit.

In a second aspect, the present disclosure provides in some embodiments an overcurrent protection method for the above-mentioned overcurrent protection circuit, including: when an output current of the $n^{th}$ first output module detected by the $n^{th}$ first overcurrent detection circuit is substantially greater than a predetermined current, providing, by the $n^{th}$ first overcurrent detection circuit, a first overcurrent indication signal to the first signal generation circuit through the output end of the $n^{th}$ first overcurrent detection circuit; when an output current of the $n^{th}$ second output module detected by the $n^{th}$ second overcurrent detection circuit is substantially greater than the predetermined current, providing, by the $n^{th}$ second overcurrent detection circuit, a second overcurrent indication signal to the second signal generation circuit through the output end of the $n^{th}$ second overcurrent detection circuit; outputting, by the first signal generation circuit, a first control signal to the first level switching circuit through the output end of the first signal generation circuit upon the receipt of the first overcurrent indication signal; outputting, by the second signal generation circuit, a second control signal to the second level switching circuit through the output end of the second signal generation circuit upon the receipt of the second overcurrent indication signal; switching, by the first level switching circuit, a level of the first control signal to acquire a third control signal, and providing the third control signal to the control circuit; switching, by the second level switching circuit, a level of the second control signal to acquire a fourth control signal, and providing the fourth control signal to the control circuit; providing, by the control circuit, an OFF control signal to the $n^{th}$ output control module within a predetermined time period ever since the receipt of the third control signal and/or the fourth control signal; and controlling, by the $n^{th}$ output control module, the $n^{th}$ first output module to stop the output of a first voltage signal through the $n^{th}$ clock signal output end and controlling the $n^{th}$ second output module to stop the output of a second voltage signal through the $n^{th}$ clock signal output end upon the receipt of the OFF control signal.

In some possible embodiments of the present disclosure, the overcurrent protection method further includes: providing, by the control circuit, a normal operation control signal to the $n^{th}$ output control module after a predetermined time period upon the receipt of the third control signal and/or the fourth control single; and providing, by the $n^{th}$ output control module upon the receipt of the normal operation control signal, an $n^{th}$ first output control signal to the $n^{th}$ first output module and providing an $n^{th}$ second output control signal to the $n^{th}$ second output module under the control of an input control signal from an input clock signal end.

In a third aspect, the present disclosure provides in some embodiments a clock signal generation circuit including the above-mentioned overcurrent protection circuit and N clock signal generation units, and N is a positive integer. An $n^{th}$ clock signal generation unit includes an $n^{th}$ clock signal output end, an $n^{th}$ output control module, an $n^{th}$ first output control end, an $n^{th}$ first output module, an $n^{th}$ second output control end and an $n^{th}$ second output module, the $n^{th}$ output control module is configured to provide an $n^{th}$ first output control signal to the $n^{th}$ first output control end and provide an $n^{th}$ second output control signal to the $n^{th}$ second output control end, the $n^{th}$ first output module is configured to control whether to output a first voltage signal through the $n^{th}$ clock signal output end under the control of the $n^{th}$ first output control signal, the $n^{th}$ second output module is configured to control whether to output a second voltage signal through the $n^{th}$ clock signal output end under the control of the $n^{th}$ second output control signal, and n is a positive integer smaller than or equal to N.

In some possible embodiments of the present disclosure, the $n^{th}$ output control module includes a first phase inverter, a fourth OR gate, a fifth OR gate, a second phase inverter, a third phase inverter, a third level switching circuit, a fourth level switching circuit, a P-type driving circuit, and an N-type driving circuit. The control circuit of the overcurrent protection circuit includes an RS trigger. An input end of the first phase inverter is electrically connected to an input clock signal end, an output end of the first phase inverter is electrically connected to a first input end of the fourth OR gate, and a second input end of the fourth OR gate is electrically connected to a positive-phase output end of the RS trigger. A first input end of the fifth OR gate is electrically connected to the positive-phase output end of the RS trigger, and a second input end of the fifth OR gate is electrically connected to the input clock signal end. An input end of the second phase inverter is electrically connected to an output end of the fourth OR gate, and an input end of the third phase inverter is electrically connected to an output end of the fifth OR gate. The third level switching circuit is electrically connected to an output end of the second phase inverter, and configured to switch a level of a signal from the output end of the second phase inverter to acquire a first output control signal and provide the first output control signal to the P-type driving circuit. The P-type driving circuit is configured to provide the first output control signal to the $n^{th}$ first output control end. The fourth level switching circuit is electrically connected to an output end of the third phase inverter, and configured to switch a level of a signal from the output end of the third phase inverter to acquire a second output control signal and provide the second output control signal to the N-type driving circuit. The N-type driving circuit is configured to provide the second output control signal to the $n^{th}$ second output control end.

In some possible embodiments of the present disclosure, the first output module includes a first output transistor, and the second output module includes a second output transistor. A control electrode of the first output transistor is electrically connected to the $n^{th}$ first output control end, a first electrode of the first output transistor is electrically connected to a high voltage end via a first resistor, and a second electrode of the first output transistor is electrically connected to the $n^{th}$ clock signal output end. A control electrode of the second output transistor is electrically connected to the $n^{th}$ second output control end, a first electrode of the second output transistor is electrically connected to the $n^{th}$ clock signal output end, and a second electrode of the second output transistor is electrically connected to a low voltage end via a second resistor.

In a fourth aspect, the present disclosure provides in some embodiments a display device including the above-mentioned clock signal generation circuit.

According to the overcurrent protection circuit, the overcurrent protection method, the clock signal generation circuit and the display device in the embodiments of the present disclosure, it is able to provide the overcurrent protection on the clock signal generation circuit merely through two level switching circuits. When the detected output current from at least one first output module and/or the detected output current from at least one second output module exceed the predetermined current, it is able to provide the overcurrent protection with a small occupation area.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be triodes, thin film transistors (TFT), field effect transistors (FETs) or any other elements having an identical characteristic. In order to differentiate two electrodes other than a control electrode from each other, one of the two electrodes is called as first electrode and the other is called as second electrode.

In actual use, when the transistor is a triode, the control electrode may be a base, the first electrode may be a collector and the second electrode may be an emitter, or the control electrode may be a base, the first electrode may be an emitter and the second electrode may be a collector.

In actual use, when the transistor is a TFT or FET, the control electrode may be a gate electrode, the first electrode may be a drain electrode and the second electrode may be a source electrode, or the control electrode may be a gate electrode, the first electrode may be a source electrode and the second electrode may be a drain electrode.

Figure 1:
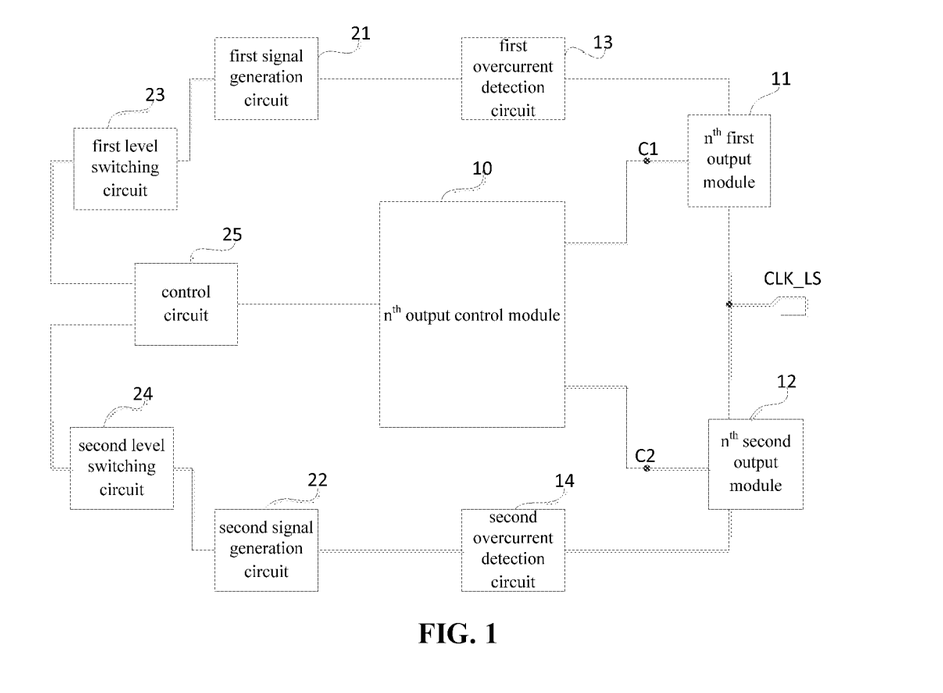
FIG. 1 is a structural view of an overcurrent protection circuit according to some embodiments of the present disclosure.

The present disclosure provides in some embodiments an overcurrent protection circuit for a clock signal generation circuit. The clock signal generation circuit includes N clock signal generation units, and N is a positive integer. As shown in FIG. 1, an $n^{th}$ clock signal generation unit includes an $n^{th}$ clock signal output end CLK_LS, an $n^{th}$ output control module 10, an $n^{th}$ first output control end C1, an $n^{th}$ first output module 11, an $n^{th}$ second output control end C2 and an $n^{th}$ second output module 12.

The $n^{th}$ output control module 10 is electrically connected to the $n^{th}$ first output control end C1 and the $n^{th}$ second output control end C2, and configured to provide an $n^{th}$ first output control signal to the $n^{th}$ first output control end C1 and provide an $n^{th}$ second output control signal to the $n^{th}$ second output control end C2.

The $n^{th}$ first output module 11 is electrically connected to the $n^{th}$ first output control end C1 and the $n^{th}$ clock signal output end CLK_LS, and configured to control whether to output a first voltage signal through the $n^{th}$ clock signal output end CLK_LS under the control of the $n^{th}$ first output control signal from C1.

The $n^{th}$ second output module 12 is electrically connected to the $n^{th}$ second output control end C2 and the $n^{th}$ clock signal output end CLK_LS, and configured to control whether to output a second voltage signal through the $n^{th}$ clock signal output end CLK_LS under the control of the $n^{th}$ second output control signal from C2, where n is a positive integer smaller than or equal to N.

The overcurrent protection circuit includes N first overcurrent detection circuits, N second overcurrent detection circuits, a first signal generation circuit 21, a second signal generation circuit 22, a first level switching circuit 23, a second level switching circuit 24 and a control circuit 25.

As shown in FIG. 1, an $n^{th}$ first overcurrent detection circuit 13 is electrically connected to the $n^{th}$ first output module 11 and the first signal generation circuit 21, and configured to provide a first overcurrent indication signal to the first signal generation circuit 21 through an output end of the $n^{th}$ first overcurrent detection circuit 13 when an output current of the $n^{th}$ first output module 11 is substantially greater than a predetermined current.

An $n^{th}$ second overcurrent detection circuit 14 is electrically connected to the $n^{th}$ second output module 12 and the second signal generation circuit 22, and configured to provide a second overcurrent indication signal to the second signal generation circuit 22 through an output end of the $n^{th}$ second overcurrent detection circuit 14 when an output current of the $n^{th}$ second output module 12 is substantially greater than the predetermined current.

The first signal generation circuit 21 is electrically connected to the first level switching circuit 23, and configured to output a first control signal to the first level switching circuit 23 through an output end of the first signal generation circuit 21 upon the receipt of the first overcurrent indication signal.

The second signal generation circuit 22 is electrically connected to the second level switching circuit 24, and configured to output a second control signal to the second level switching circuit 24 through an output end of the second signal generation circuit 22 upon the receipt of the second overcurrent indication signal.

The first level switching circuit 23 is electrically connected to the control circuit 25, and configured to switch a level of the first control signal to acquire a third control signal, and provide the third control signal to the control circuit 25.

The second level switching circuit 24 is electrically connected to the control circuit 25, and configured to switch a level of the second control signal to acquire a fourth control signal, and provide the fourth control signal to the control circuit 25.

The control circuit 25 is electrically connected to the $n^{th}$ output control module 10, and configured to provide an OFF control signal to the $n^{th}$ output control module 10 within a predetermined time period ever since the receipt of the third control signal and/or the fourth control signal.

The $n^{th}$ output control module 10 is configured to control the $n^{th}$ first output module 11 to stop the output of the first voltage signal through the $n^{th}$ clock signal output end and control the $n^{th}$ second output module 12 to stop the output of the second voltage signal through the $n^{th}$ clock signal output end upon the receipt of the OFF control signal.

In the embodiments of the present disclosure, the predetermined current may be selected according to the practical need, and the predetermined time period may also be selected according to the practical need.

For the overcurrent protection circuit in FIG. 1, during the operation, when the output current of the $n^{th}$ first output module 11 detected by the $n^{th}$ first overcurrent detection circuit 13 is substantially greater than the predetermined current, the $n^{th}$ first overcurrent detection circuit 13 may provide the first overcurrent indication signal to the first signal generation circuit 21, and when the output current of the $n^{th}$ second output module 12 detected by the $n^{th}$ second overcurrent detection circuit 14 is substantially greater than the predetermined current, the $n^{th}$ second overcurrent detection circuit 14 may provide the second overcurrent indication signal to the second signal generation circuit 22.

The first signal generation circuit 21 may output the first control signal to the first level switching circuit 23 upon the receipt of the first overcurrent indication signal, and the second signal generation circuit 22 may output the second control signal to the second level switching circuit 24 upon the receipt of the second overcurrent indication signal.

The first overcurrent indication signal may be an overcurrent indication signal for a P-type transistor. The first overcurrent indication signal may be within a high voltage domain, and the first control signal may also be within a high voltage domain. The second overcurrent indication signal may be an overcurrent indication signal for an N-type transistor. The second overcurrent indication signal may be within a negative voltage domain, and the second control signal may also be within a negative voltage domain.

The first level switching circuit 23 may switch the level of the first control signal to acquire the third control signal, and provide the third control signal to the control circuit 25. The third control signal may be within a ground voltage domain.

The second level switching circuit may be electrically connected to the control circuit 25, switch the level of the second control signal to acquire the fourth control signal, and provide the fourth control signal to the control circuit 25. The fourth control signal may be within a ground voltage domain.

For example, when the first control signal is within the high voltage domain, it refers to, but not limited to, that the level of the first control signal is switched between 25V and 30V. In other words, when the first control signal corresponds to a logic "1", the level of the first control signal may be 30V, and when the first control signal corresponds to a logic "0", the level of the first control signal may be 25V.

For example, when the second control signal is within the negative voltage domain, it refers to, but not limited to, that the level of the second control signal is switched between −10V and −5V. In other words, when the second control signal corresponds to a logic "1", the level of the second control signal may be −5V, and when the second control signal corresponds to a logic "0", the level of the second control signal may be −10V.

For example, when the third control signal is within the ground voltage domain, it refers to, but not limited to, that the level of the third control signal is switched between 0V and 5V. In other words, when the third control signal corresponds to a logic "1", the level of the third control signal may be 5V, and when the third control signal corresponds to a logic "0", the level of the third control signal may be 0V.

For example, when the four control signal is within the ground voltage domain, it refers to, but not limited to, that the level of the four control signal is switched between 0V and 5V. In other words, when the four control signal corresponds to a logic "1", the level of the four control signal may be 5V, and when the four control signal corresponds to a logic "0", the level of the four control signal may be 0V.

When the first level switching circuit 23 switches the level of the first control signal to acquire the third control signal, the first control signal within the high voltage domain may be switched into the third control signal within the ground voltage domain.

When the second level switching circuit 24 switches the level of the second control signal to acquire the four control signal, the second control signal within the negative voltage domain may be switched into the fourth control signal within the ground voltage domain.

The control circuit 25 may provide the OFF control signal to the $n^{th}$ output control module 10 within the predetermined time period ever since the receipt of the third control signal and/or the fourth control signal.

The $n^{th}$ output control module 10 may, upon the receipt of the OFF control signal, control the $n^{th}$ first output module 11 to stop the output of the first voltage signal through the $n^{th}$ clock signal output end, and control the $n^{th}$ second output module 12 to stop the output of the second voltage signal through the $n^{th}$ clock signal output end, i.e., control a first output transistor of the $n^{th}$ first output module 11 and a second output transistor of the $n^{th}$ second output module 12 to be turned off.

According to the overcurrent protection circuit in the embodiments of the present disclosure, it is able to provide the overcurrent protection on the clock signal generation circuit merely through two level switching circuits. When the detected output current from at least one first output module and/or the detected output current from at least one second output module exceed the predetermined current, it is able to provide the overcurrent protection.

As shown in FIG. 1, the $n^{th}$ first output module 11 is further electrically connected to a high voltage end, the high voltage end is configured to provide a high voltage signal VGH, and VGH may be, but not limited to, a 30V voltage signal.

The $n^{th}$ second output module 12 is further electrically connected to a low voltage end, the low voltage end is configured to provide a low voltage signal VGL, and VGL may be, but not limited to, a −10V voltage signal.

For example, during the implementation, the $n^t$ first output module may include a first output transistor and the $n^{th}$ second output module may include a second output transistor.

For example, a control electrode of the first output transistor may be electrically connected to the $n^{th}$ first output control end, a first electrode of the first output transistor may be electrically connected to a high voltage end via a first resistor, and a second electrode of the first output transistor may be electrically connected to the $n^t$ clock signal output end.

For example, a control electrode of the second output transistor may be electrically connected to the $n^{th}$ second output control end, a first electrode of the second output transistor may be electrically connected to the $n^{th}$ clock signal output end, and a second electrode of the second output transistor may be electrically connected to a low voltage end via a second resistor.

For example, the output current of the $n^{th}$ first output module 11 may be a current flowing through the first electrode of the first output transistor, and the output current of the $n^{th}$ second output module 12 may be a current flowing through the second electrode of the second output transistor. However, the present disclosure will not be limited thereto.

For example, in the embodiments of the present disclosure, the control circuit is further configured to provide a normal operation control signal to the $n^{th}$ output control module after a predetermined time period upon the receipt of the third control signal and/or the fourth control signal.

For example, the $n^{th}$ output control module is configured to, upon the receipt of the normal operation control signal, provide an $n^{th}$ first output control signal to the $n^{th}$ first output module and provide an $n^{th}$ second output control signal to the $n^{th}$ second output module under the control of an input clock signal from the input clock signal end.

During the implementation, upon the receipt of the third control signal and/or the fourth control signal, the control circuit may provide the normal operation control signal to the $n^{th}$ output control module after the predetermined time period, so that the $n^{th}$ output control module controls the $n^{th}$ first output module and the $n^{th}$ second output module to operate normally under the control of the input clock signal.

In some possible embodiments of the present disclosure, the control circuit may include a first OR gate, an RS trigger and a timer.

For example, a first input end of the first OR gate is configured to receive the third control signal, a second input end of the first OR gate is configured to receive the fourth control signal, and an output end of the first OR gate may be electrically connected to a setting end of the RS trigger.

For example, a positive-phase output end of the RS trigger may be electrically connected to the $n^{th}$ output control module.

For example, the timer may be electrically connected to the positive-phase output end, and configured to be started when the OFF control signal is outputted by the positive-phase output end, and provide a resetting signal to a resetting end of the RS trigger after a predetermined time period, so as to enable the RS trigger to provide the normal operation control signal through the positive-phase output end.

When the output current of the at least one first output module is substantially greater than the predetermined current, the third control signal may correspond to a logic "1", and when the output current of the at least one second output module is substantially greater than the predetermined current, the fourth control signal may correspond to a logic "0". At this time, a voltage signal from the first OR gate may correspond to a logic "1" and the setting end of the RS trigger may receive a logic "1", so a voltage signal from the positive-phase output end of the RS trigger may correspond to a logic "1". At this time, the $n^{th}$ output control module may control the $n^{th}$ first output module to stop working, and control the $n^{th}$ second output module to stop working. In addition, when the voltage signal from the first OR gate corresponds to a logic "1", the timer may be started, and after the predetermined time period, it may provide a voltage signal corresponding to a logic "1" to the resetting end of the RS trigger, so as to enable the RS trigger to output a voltage signal corresponding to a logic "0" through its output end, thereby to prevent the operation of the $n^{th}$ output control module from being adversely affected. The $n^{th}$ output control module, the $n^{th}$ first output module and the $n^{th}$ second output module may operate normally.

Figure 2:
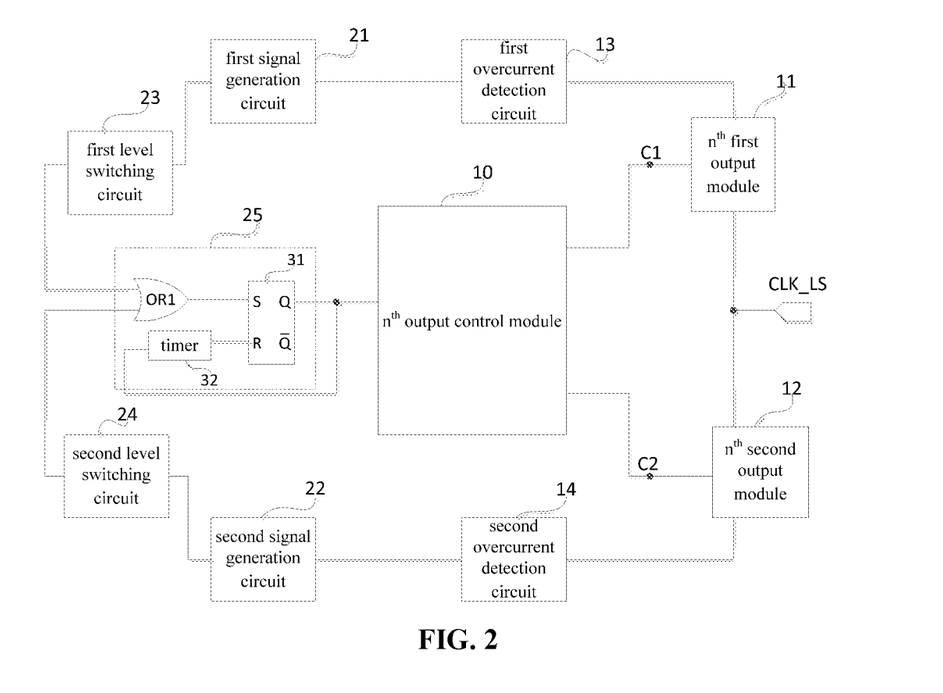
FIG. 2 is another structural view of the overcurrent protection circuit according to some embodiments of the present disclosure.

As shown in FIG. 2, on the basis of the overcurrent protection circuit in FIG. 1, the control circuit 25 includes a first OR gate OR1, an RS trigger 31 and a timer 32. A first input end of the first OR gate OR1 is configured to receive the third control signal, a second input end of the first OR gate OR1 is configured to receive the fourth control signal, and an output end of the first OR gate OR1 is electrically connected to a setting end S of the RS trigger 31. A positive-phase output end Q of the RS trigger 31 is electrically connected to the $n^{th}$ output control module 10. The timer 32 is electrically connected to the positive-phase output end Q, and configured to be started when the OFF control signal is outputted by the positive-phase output end Q, and provide a resetting signal to a resetting end R of the RS trigger 31 after a predetermined time period, so as to enable the RS trigger 31 to provide the normal operation control signal through the positive-phase output end Q.

During the implementation, for example, the first signal generation circuit may include a second OR gate, and the second OR gate may include N input ends. An $n^{th}$ input end of the second OR gate may be electrically connected to the output end of the $n^{th}$ first overcurrent detection circuit, and an output end of the second OR gate may be electrically connected to the output end of the first signal generation circuit.

In some possible embodiments of the present disclosure, the second signal generation circuit may include a third OR gate, and the third OR gate may include N input ends. An $n^{th}$ input end of the third OR gate may be electrically connected to the output end of the $n^{th}$ second overcurrent detection circuit, and an output end of the third OR gate may be electrically connected to the output end of the second signal generation circuit.

Figure 3:
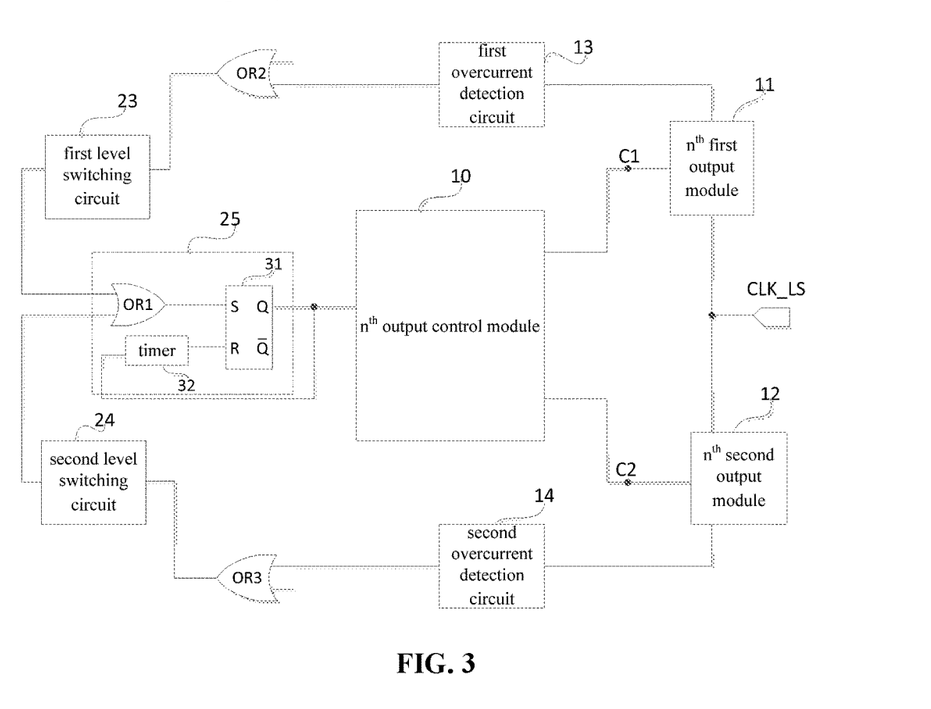
FIG. 3 is yet another structural view of the overcurrent protection circuit according to some embodiments of the present disclosure.

As shown in FIG. 3, on the basis of the overcurrent protection circuit in FIG. 2, for example, the first signal generation circuit includes a second OR gate OR2, and the second signal generation circuit includes a third OR gate OR3. An $n^{th}$ input end of the second OR gate OR2 is electrically connected to the output end of the $n^{th}$ first overcurrent detection circuit 13, an $n^{th}$ input end of the third OR gate OR3 is electrically connected to the output end of the $n^{th}$ second overcurrent detection circuit 14, an output end of the second OR gate OR2 is electrically connected to the first level switching circuit 23, and an output end of the third OR gate OR3 is electrically connected to the second level switching circuit 24.

The present disclosure further provides in some embodiments an overcurrent protection method for the above-mentioned overcurrent protection circuit, which includes: when an output current of the $n^{th}$ first output module detected by the $n^{th}$ first overcurrent detection circuit is substantially greater than a predetermined current, providing, by the $n^{th}$ first overcurrent detection circuit, a first overcurrent indication signal to the first signal generation circuit through the output end of the $n^{th}$ first overcurrent detection circuit; when an output current of the $n^{th}$ second output module detected by the $n^{th}$ second overcurrent detection circuit is substantially greater than the predetermined current, providing, by the $n^{th}$ second overcurrent detection circuit, a second overcurrent indication signal to the second signal generation circuit through the output end of the $n^{th}$ second overcurrent detection circuit; outputting, by the first signal generation circuit, a first control signal to the first level switching circuit through the output end of the first signal generation circuit upon the receipt of the first overcurrent indication signal; outputting, by the second signal generation circuit, a second control signal to the second level switching circuit through the output end of the second signal generation circuit upon the receipt of the second overcurrent indication signal; switching, by the first level switching circuit, a level of the first control signal to acquire a third control signal, and providing the third control signal to the control circuit; switching, by the second level switching circuit, a level of the second control signal to acquire a fourth control signal, and providing the fourth control signal to the control circuit; providing, by the control circuit, an OFF control signal to the $n^{th}$ output control module within a predetermined time period ever since the receipt of the third control signal and/or the fourth control signal; and controlling, by the $n^{th}$ output control module, the $n^{th}$ first output module to stop the output of a first voltage signal through the $n^{th}$ clock signal output end and controlling the $n^{th}$ second output module to stop the output of a second voltage signal through the $n^{th}$ clock signal output end upon the receipt of the OFF control signal.

According to the overcurrent protection method in the embodiments of the present disclosure, when the detected output current from the at least one first output module and/or the detected output current from the at least one second output module exceeds the predetermined current, it is able to provide the overcurrent protection.

During the implementation, the overcurrent protection method in the embodiments of the present disclosure may further include: providing, by the control circuit, a normal operation control signal to the $n^{th}$ output control module after a predetermined time period upon the receipt of the third control signal and/or the fourth control single; and providing, by the $n^{th}$ output control module upon the receipt of the normal operation control signal, an $n^{th}$ first output control signal to the $n^{th}$ first output module and providing an $n^{th}$ second output control signal to the $n^{th}$ second output module under the control of an input control signal from an input clock signal end.

The present disclosure further provides in some embodiments a clock signal generation circuit which includes the above-mentioned overcurrent protection circuit and N clock signal generation unit, where N is a positive integer. An $n^{th}$ clock signal generation unit includes an $n^{th}$ clock signal output end, an $n^{th}$ output control module, an $n^{th}$ first output control end, an $n^{th}$ first output module, an $n^{th}$ second output control end and an $n^{th}$ second output module, the $n^{th}$ output control module is configured to provide an $n^{th}$ first output control signal to the $n^{th}$ first output control end and provide an $n^{th}$ second output control signal to the $n^{th}$ second output control end, the $n^{th}$ first output module is configured to control whether to output a first voltage signal through the $n^{th}$ clock signal output end under the control of the $n^{th}$ first output control signal, the $n^{th}$ second output module is configured to control whether to output a second voltage signal through the $n^{th}$ clock signal output end under the control of the $n^{th}$ second output control signal, where n is a positive integer smaller than or equal to N.

According to the clock signal generation circuit in the embodiments of the present disclosure, it is able to provide overcurrent protection for the N clock signal generation units.

In some possible embodiments of the present disclosure, the $n^{th}$ output control module may include a first phase inverter, a fourth OR gate, a fifth OR gate, a second phase inverter, a third phase inverter, a third level switching circuit, a fourth level switching circuit, a P-type driving circuit, and an N-type driving circuit. The control circuit of the overcurrent protection circuit may include an RS trigger.

An input end of the first phase inverter may be electrically connected to an input clock signal end, an output end of the first phase inverter may be electrically connected to a first input end of the fourth OR gate, and a second input end of the fourth OR gate may be electrically connected to a positive-phase output end of the RS trigger.

A first input end of the fifth OR gate may be electrically connected to the positive-phase output end of the RS trigger, and a second input end of the fifth OR gate may be electrically connected to the input clock signal end.

An input end of the second phase inverter may be electrically connected to an output end of the fourth OR gate, and an input end of the third phase inverter may be electrically connected to an output end of the fifth OR gate.

The third level switching circuit may be electrically connected to an output end of the second phase inverter, and configured to switch a level of a signal from the output end of the second phase inverter to acquire a first output control signal and provide the first output control signal to the P-type driving circuit.

The P-type driving circuit is configured to provide the first output control signal to the $n^{th}$ first output control end.

The fourth level switching circuit may be electrically connected to an output end of the third phase inverter, and configured to switch a level of a signal from the output end of the third phase inverter to acquire a second output control signal and provide the second output control signal to the N-type driving circuit.

The N-type driving circuit is configured to provide the second output control signal to the $n^{th}$ second output control end.

Figure 4:
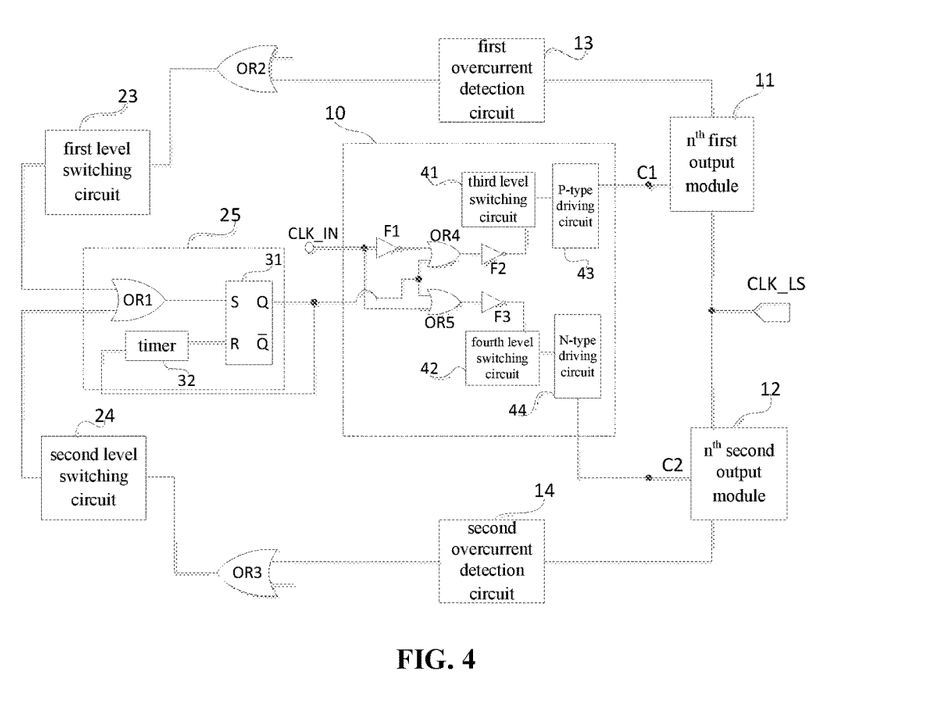
FIG. 4 is a structural view of a clock signal generation circuit according to some embodiments of the present disclosure.

As shown in FIG. 4, on the basis of FIG. 3, the $n^{th}$ output control module 10 includes a first phase inverter F1, a fourth OR gate OR4, a fifth OR gate OR5, a second phase inverter F2, a third phase inverter F3, a third level switching circuit 41, a fourth level switching circuit 42, a P-type driving circuit 43, and an N-type driving circuit 44.

An input end of the first phase inverter F1 is electrically connected to an input clock signal end, an output end of the first phase inverter F1 is electrically connected to a first input end of the fourth OR gate OR4, and a second input end of the fourth OR gate OR4 is electrically connected to a positive-phase output end Q of the RS trigger 41. The input clock signal end is configured to provide an input clock signal CLK_IN.

A first input end of the fifth OR gate OR5 is electrically connected to the positive-phase output end Q of the RS trigger 31, and a second input end of the fifth OR gate OR5 is electrically connected to the input clock signal end.

An input end of the second phase inverter F2 is electrically connected to an output end of the fourth OR gate OR4, and an input end of the third phase inverter F3 is electrically connected to an output end of the fifth OR gate OR5.

The third level switching circuit 41 is electrically connected to an output end of the second phase inverter F2, and configured to switch a level of a signal from the output end of the second phase inverter F2 to acquire a first output control signal and provide the first output control signal to the P-type driving circuit 43.

The P-type driving circuit 43 is configured to provide the first output control signal to the $n^{th}$ first output control end C1, so as to increase a driving capability of the $n^{th}$ first output control end C1.

The fourth level switching circuit 42 is electrically connected to an output end of the third phase inverter F3, and configured to switch a level of a signal from the output end of the third phase inverter F to acquire a second output control signal and provide the second output control signal to the N-type driving circuit 44.

The N-type driving circuit 44 is configured to provide the second output control signal to the $n^{th}$ second output control end C2, so as to increase a driving capability of the $n^{th}$ second output control end C2.

In the embodiments of the present disclosure, for example, the first output module may include a first output transistor, and the second output module may include a second output transistor.

A control electrode of the first output transistor may be electrically connected to the $n^{th}$ first output control end, a first electrode of the first output transistor may be electrically connected to a high voltage end via a first resistor, and a second electrode of the first output transistor may be electrically connected to the $n^{th}$ clock signal output end.

A control electrode of the second output transistor may be electrically connected to the $n^{th}$ second output control end, a first electrode of the second output transistor may be electrically connected to the $n^{th}$ clock signal output end, and a second electrode of the second output transistor may be electrically connected to a low voltage end via a second resistor.

Figure 5:
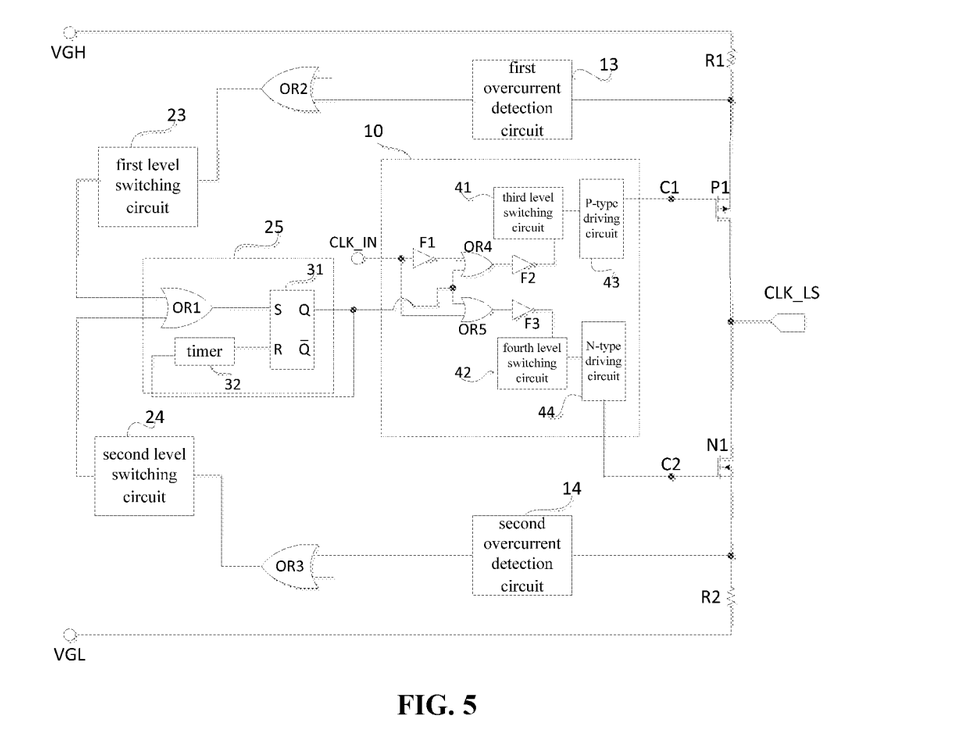
FIG. 5 is another structural view of the clock signal generation circuit according to some embodiments of the present disclosure.

As shown in FIG. 5, on the basis of FIG. 4, for example, the first output module includes a first output transistor P1, and the second output module includes a second output transistor N1.

A gate electrode of the first output transistor P1 is electrically connected to the $n^{th}$ first output control end C1, a source electrode of the first output transistor P1 is electrically connected to a high voltage end via a first resistor R1, and a drain electrode of the first output transistor P1 is electrically connected to the $n^{th}$ clock signal output end CLK_LS. The high voltage end is configured to provide a high voltage signal VGH.

A gate electrode of the second output transistor N1 is electrically connected to the $n^{th}$ second output control end C2, a drain electrode of the second output transistor N1 is electrically connected to the $n^{th}$ clock signal output end CLK_LS, and a source electrode of the second output transistor N1 is electrically connected to a low voltage end via a second resistor R2. The low voltage end is configured to provide a low voltage signal VGL.

In FIG. 5, P1 is, but not limited to, a P-channel Metal Oxide Semiconductor (PMOS) transistor, and N1 is, but not limited to, an N-channel Metal Oxide Semiconductor (NMOS) transistor.

During the operation of the clock signal generation circuit in FIG. 5, when a current flowing through the source electrode of P1 and/or a current flowing through the source electrode of N1 (or the output current of the other first output module and/or the output current of the other second output module) exceed the predetermined current, the overcurrent indication signal may be latched in the RS trigger 31, and the timer may be started. The RS trigger 31 may output a voltage signal corresponding to a logic "1" through its positive-phase output end Q, so OR4 and OR5 may each output a voltage signal corresponding to a logic "1", and F2 and F3 may each output a voltage signal corresponding to a logic "0". The voltage signal outputted by F2 and the voltage signal outputted by F3 may each be within a ground voltage domain. The third level switching circuit 41 may convert the voltage signal from F2 into the first output control signal within a high voltage domain, and the fourth level switching circuit 42 may convert the voltage signal from F3 into the second output control signal within a negative voltage domain, so as to turn off both P1 and N1.

In addition, when the timer has been started, it may provide a voltage signal corresponding to a logic "1" to the resetting end R of the RS trigger 31 after a predetermined time period, so as to enable the RS trigger 31 to output a voltage signal corresponding to a logic "0" through its positive-phase output end Q. At this time, the operation of OR4 and OR5 will not be adversely affected.

The present disclosure further provides in some embodiments a display device including the above-mentioned clock signal generation circuit.

The display device in the embodiments of the present disclosure may be any product or member having a display function, e.g., mobile phone, tablet computer, television, display, laptop computer, digital photo frame or navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An overcurrent protection circuit for a clock signal generation circuit, the clock signal generation circuit comprising N clock signal generation units, wherein N is a positive integer, each $n^{th}$ clock signal generation unit comprising an $n^{th}$ clock signal output end, an $n^{th}$ output control module, an $n^{th}$ first output control end, an $n^{th}$ first output module, an $n^{th}$ second output control end and an $n^{th}$ second output module, the $n^{th}$ output control module configured to provide an $n^{th}$ first output control signal to the $n^{th}$ first output control end and provide an $n^{th}$ second output control signal to the $n^{th}$ second output control end, the $n^{th}$ first output module configured to control whether to output a first voltage signal through the $n^{th}$ clock signal output end under the control of the $n^{th}$ first output control signal, the $n^{th}$ second output module configured to control whether to output a second voltage signal through the $n^{th}$ clock signal output end under the control of the $n^{th}$ second output control signal, wherein n is a positive integer smaller than or equal to N, wherein:

the overcurrent protection circuit comprises N first overcurrent detection circuits, N second overcurrent detection circuits, a first signal generation circuit, a second signal generation circuit, a first level switching circuit, a second level switching circuit and a control circuit;

each $n^{th}$ first overcurrent detection circuit is configured to provide a first overcurrent indication signal to the first signal generation circuit through an output end of the $n^{th}$ first overcurrent detection circuit when an output current of the $n^{th}$ first output module is substantially greater than a predetermined current;

each $n^{th}$ second overcurrent detection circuit is configured to provide a second overcurrent indication signal to the second signal generation circuit through an output end of the $n^{th}$ second overcurrent detection circuit when an output current of the $n^{th}$ second output module is substantially greater than the predetermined current;

the first signal generation circuit is configured to output a first control signal to the first level switching circuit through an output end of the first signal generation circuit upon receiving the first overcurrent indication signal;

the second signal generation circuit is configured to output a second control signal to the second level switching circuit through an output end of the second signal generation circuit upon receiving the second overcurrent indication signal;

the first level switching circuit is configured to switch a level of the first control signal to acquire a third control signal, and provide the third control signal to the control circuit;

the second level switching circuit is configured to switch a level of the second control signal to acquire a fourth control signal, and provide the fourth control signal to the control circuit;

the control circuit is configured to provide an OFF control signal to the $n^{th}$ output control module within a predetermined time period after receiving the third control signal and/or the fourth control signal; and the $n^{th}$ output control module is configured to control the $n^{th}$ first output module to stop the output of the first voltage signal through the $n^{th}$ clock signal output end and control the $n^{th}$ second output module to stop the output of the second voltage signal through the $n^{th}$ clock signal output end upon receiving the OFF control signal.

2. The overcurrent protection circuit according to claim 1, wherein:

the control circuit is further configured to provide a normal operation control signal to the $n^{th}$ output control module after a predetermined time period upon receiving the third control signal and/or the fourth control signal; and the $n^{th}$ output control module is further configured to, upon receiving the normal operation control signal, provide the $n^{th}$ first output control signal to the $n^{th}$ first output module and provide the $n^{th}$ second output control signal to the $n^{th}$ second output module under the control of an input clock signal from an input clock signal end.

3. The overcurrent protection circuit according to claim 2, wherein the control circuit comprises a first OR gate, a Resetting/Setting (RS) trigger and a timer, and wherein:

a first input end of the first OR gate is configured to receive the third control signal, a second input end of the first OR gate is configured to receive the fourth control signal, and an output end of the first OR gate is electrically connected to a setting end of the RS trigger;

a positive-phase output end of the RS trigger is electrically connected to the $n^{th}$ output control module; and the timer is electrically connected to the positive-phase output end, and configured to be started when the OFF control signal is outputted by the positive-phase output end, and provide a resetting signal to a resetting end of the RS trigger after a predetermined time period, so as to enable the RS trigger to provide the normal operation control signal through the positive-phase output end.

4. A clock signal generation circuit, comprising the overcurrent protection circuit according to claim 3 and N clock signal generation units, wherein N is a positive integer, and wherein:

each $n^{th}$ clock signal generation unit comprises an $n^{th}$ clock signal output end, an $n^{th}$ output control module, an $n^{th}$ first output control end, an $n^{th}$ first output module, an $n^{th}$ second output control end and an $n^{th}$ second output module;

the $n^{th}$ output control module is configured to provide an $n^{th}$ first output control signal to the $n^{th}$ first output control end and provide an $n^{th}$ second output control signal to the $n^{th}$ second output control end;

the $n^{th}$ first output module is configured to control whether to output a first voltage signal through the $n^{th}$ clock signal output end under the control of the $n^{th}$ first output control signal;

the $n^{th}$ second output module is configured to control whether to output a second voltage signal through the $n^{th}$ clock signal output end under the control of the $n^{th}$ second output control signal, where n is a positive integer smaller than or equal to N.

5. An overcurrent protection method for the overcurrent protection circuit according to claim 3, comprising:

when an output current of the $n^{th}$ first output module detected by the $n^{th}$ first overcurrent detection circuit is substantially greater than a predetermined current, providing, by the $n^{th}$ first overcurrent detection circuit, a first overcurrent indication signal to the first signal generation circuit through the output end of the $n^{th}$ first overcurrent detection circuit;

when an output current of the $n^{th}$ second output module detected by the $n^{th}$ second overcurrent detection circuit is substantially greater than the predetermined current, providing, by the $n^{th}$ second overcurrent detection circuit, a second overcurrent indication signal to the second signal generation circuit through the output end of the $n^{th}$ second overcurrent detection circuit;

outputting, by the first signal generation circuit, a first control signal to the first level switching circuit through the output end of the first signal generation circuit upon receiving the first overcurrent indication signal;

outputting, by the second signal generation circuit, a second control signal to the second level switching circuit through the output end of the second signal generation circuit upon receiving the second overcurrent indication signal;

switching, by the first level switching circuit, a level of the first control signal to acquire a third control signal, and providing the third control signal to the control circuit;

switching, by the second level switching circuit, a level of the second control signal to acquire a fourth control signal, and providing the fourth control signal to the control circuit;

providing, by the control circuit, an OFF control signal to the $n^{th}$ output control module within a predetermined time period after receiving the third control signal and/or the fourth control signal; and controlling, by the $n^{th}$ output control module, the $n^{th}$ first output module to stop the output of a first voltage signal through the $n^{th}$ clock signal output end and controlling the $n^{th}$ second output module to stop the output of a second voltage signal through the $n^{th}$ clock signal output end upon receiving the OFF control signal.

6. The overcurrent protection circuit according to claim 2, wherein:

the first signal generation circuit comprises a second OR gate, the second OR gate comprises N input ends, an $n^{th}$ input end of the second OR gate is electrically connected to the output end of the $n^{th}$ first overcurrent detection circuit, and an output end of the second OR gate is electrically connected to the output end of the first signal generation circuit.

7. The overcurrent protection circuit according to claim 2, wherein:
the second signal generation circuit comprises a third OR gate, the third OR gate comprises N input ends, an $n^{th}$ input end of the third OR gate is electrically connected to the output end of the $n^{th}$ second overcurrent detection circuit, and an output end of the third OR gate is electrically connected to the output end of the second signal generation circuit.

8. A clock signal generation circuit, comprising the overcurrent protection circuit according to claim 2 and N clock signal generation units, wherein N is a positive integer, and wherein:
each $n^{th}$ clock signal generation unit comprises an $n^{th}$ clock signal output end, an $n^{th}$ output control module, an $n^{th}$ first output control end, an $n^{th}$ first output module, an $n^{th}$ second output control end and an $n^{th}$ second output module;
the $n^{th}$ output control module is configured to provide an $n^{th}$ first output control signal to the $n^{th}$ first output control end and provide an $n^{th}$ second output control signal to the $n^{th}$ second output control end;
the $n^{th}$ first output module is configured to control whether to output a first voltage signal through the $n^{th}$ clock signal output end under the control of the $n^{th}$ first output control signal;
the $n^{th}$ second output module is configured to control whether to output a second voltage signal through the $n^{th}$ clock signal output end under the control of the $n^{th}$ second output control signal, where n is a positive integer smaller than or equal to N.

9. An overcurrent protection method for the overcurrent protection circuit according to claim 2, comprising:
when an output current of the $n^{th}$ first output module detected by the $n^{th}$ first overcurrent detection circuit is substantially greater than a predetermined current, providing, by the $n^{th}$ first overcurrent detection circuit, a first overcurrent indication signal to the first signal generation circuit through the output end of the $n^{th}$ first overcurrent detection circuit;
when an output current of the $n^{th}$ second output module detected by the $n^{th}$ second overcurrent detection circuit is substantially greater than the predetermined current, providing, by the $n^{th}$ second overcurrent detection circuit, a second overcurrent indication signal to the second signal generation circuit through the output end of the $n^{th}$ second overcurrent detection circuit;
outputting, by the first signal generation circuit, a first control signal to the first level switching circuit through the output end of the first signal generation circuit upon receiving the first overcurrent indication signal;
outputting, by the second signal generation circuit, a second control signal to the second level switching circuit through the output end of the second signal generation circuit upon receiving the second overcurrent indication signal;
switching, by the first level switching circuit, a level of the first control signal to acquire a third control signal, and providing the third control signal to the control circuit;
switching, by the second level switching circuit, a level of the second control signal to acquire a fourth control signal, and providing the fourth control signal to the control circuit;
providing, by the control circuit, an OFF control signal to the $n^{th}$ output control module within a predetermined time period after receiving the third control signal and/or the fourth control signal; and
controlling, by the $n^{th}$ output control module, the $n^{th}$ first output module to stop the output of a first voltage signal through the $n^{th}$ clock signal output end and controlling the $n^{th}$ second output module to stop the output of a second voltage signal through the $n^{th}$ clock signal output end upon receiving the OFF control signal.

10. The overcurrent protection circuit according to claim 1, wherein:
the first signal generation circuit comprises a second OR gate, the second OR gate comprises N input ends, an $n^{th}$ input end of the second OR gate is electrically connected to the output end of the $n^{th}$ first overcurrent detection circuit, and an output end of the second OR gate is electrically connected to the output end of the first signal generation circuit.

11. A clock signal generation circuit, comprising the overcurrent protection circuit according to claim 10 and N clock signal generation units, wherein N is a positive integer, and wherein:
each $n^{th}$ clock signal generation unit comprises an $n^{th}$ clock signal output end, an $n^{th}$ output control module, an $n^{th}$ first output control end, an $n^{th}$ first output module, an $n^{th}$ second output control end and an $n^{th}$ second output module;
the $n^{th}$ output control module is configured to provide an $n^{th}$ first output control signal to the $n^{th}$ first output control end and provide an $n^{th}$ second output control signal to the $n^{th}$ second output control end;
the $n^{th}$ first output module is configured to control whether to output a first voltage signal through the $n^{th}$ clock signal output end under the control of the $n^{th}$ first output control signal;
the $n^{th}$ second output module is configured to control whether to output a second voltage signal through the $n^{th}$ clock signal output end under the control of the $n^{th}$ second output control signal, where n is a positive integer smaller than or equal to N.

12. The overcurrent protection circuit according to claim 1, wherein:
the second signal generation circuit comprises a third OR gate, the third OR gate comprises N input ends, an $n^{th}$ input end of the third OR gate is electrically connected to the output end of the $n^{th}$ second overcurrent detection circuit, and an output end of the third OR gate is electrically connected to the output end of the second signal generation circuit.

13. A clock signal generation circuit, comprising the overcurrent protection circuit according to claim 12 and N clock signal generation units, wherein N is a positive integer, and wherein:
each $n^{th}$ clock signal generation unit comprises an $n^{th}$ clock signal output end, an $n^{th}$ output control module, an $n^{th}$ first output control end, an $n^{th}$ first output module, an $n^{th}$ second output control end and an $n^{th}$ second output module;
the $n^{th}$ output control module is configured to provide an $n^{th}$ first output control signal to the $n^{th}$ first output control end and provide an $n^{th}$ second output control signal to the $n^{th}$ second output control end;
the $n^{th}$ first output module is configured to control whether to output a first voltage signal through the $n^{th}$ clock signal output end under the control of the $n^{th}$ first output control signal;
the $n^{th}$ second output module is configured to control whether to output a second voltage signal through the $n^{th}$ clock signal output end under the control of the $n^{th}$ second output control signal, where n is a positive integer smaller than or equal to N.

14. An overcurrent protection method for the overcurrent protection circuit according to claim 1, comprising:
when an output current of the $n^{th}$ first output module detected by the $n^{th}$ first overcurrent detection circuit is substantially greater than a predetermined current, providing, by the $n^{th}$ first overcurrent detection circuit, a first overcurrent indication signal to the first signal generation circuit through the output end of the $n^{th}$ first overcurrent detection circuit;
when an output current of the $n^{th}$ second output module detected by the $n^{th}$ second overcurrent detection circuit is substantially greater than the predetermined current, providing, by the $n^{th}$ second overcurrent detection circuit, a second overcurrent indication signal to the second signal generation circuit through the output end of the $n^{th}$ second overcurrent detection circuit;
outputting, by the first signal generation circuit, a first control signal to the first level switching circuit through the output end of the first signal generation circuit upon receiving the first overcurrent indication signal;
outputting, by the second signal generation circuit, a second control signal to the second level switching circuit through the output end of the second signal generation circuit upon receiving the second overcurrent indication signal;
switching, by the first level switching circuit, a level of the first control signal to acquire a third control signal, and providing the third control signal to the control circuit;
switching, by the second level switching circuit, a level of the second control signal to acquire a fourth control signal, and providing the fourth control signal to the control circuit;
providing, by the control circuit, an OFF control signal to the $n^{th}$ output control module within a predetermined time period after receiving the third control signal and/or the fourth control signal; and
controlling, by the $n^{th}$ output control module, the $n^{th}$ first output module to stop the output of a first voltage signal through the $n^{th}$ clock signal output end and controlling the $n^{th}$ second output module to stop the output of a second voltage signal through the $n^{th}$ clock signal output end upon receiving the OFF control signal.

15. The overcurrent protection method according to claim 14, further comprising:
providing, by the control circuit, a normal operation control signal to the $n^{th}$ output control module after a predetermined time period upon receiving the third control signal and/or the fourth control single; and
providing, by the $n^{th}$ output control module upon receiving the normal operation control signal, an $n^{th}$ first output control signal to the $n^{th}$ first output module and providing an $n^{th}$ second output control signal to the $n^{th}$ second output module under the control of an input control signal from an input clock signal end.

16. A clock signal generation circuit, comprising the overcurrent protection circuit according to claim 1 and N clock signal generation units, wherein N is a positive integer, and wherein:
each $n^{th}$ clock signal generation unit comprises an $n^{th}$ clock signal output end, an $n^{th}$ output control module, an $n^{th}$ first output control end, an $n^{th}$ first output module, an $n^{th}$ second output control end and an $n^{th}$ second output module;
the $n^{th}$ output control module is configured to provide an $n^{th}$ first output control signal to the $n^{th}$ first output control end and provide an $n^{th}$ second output control signal to the $n^{th}$ second output control end;
the $n^{th}$ first output module is configured to control whether to output a first voltage signal through the $n^{th}$ clock signal output end under the control of the $n^{th}$ first output control signal;
the $n^{th}$ second output module is configured to control whether to output a second voltage signal through the $n^{th}$ clock signal output end under the control of the $n^{th}$ second output control signal, where n is a positive integer smaller than or equal to N.

17. The clock signal generation circuit according to claim 16, wherein:
the $n^{th}$ output control module comprises a first phase inverter, a fourth OR gate, a fifth OR gate, a second phase inverter, a third phase inverter, a third level switching circuit, a fourth level switching circuit, a P-type driving circuit, and an N-type driving circuit;
the control circuit of the overcurrent protection circuit comprises an RS trigger;
an input end of the first phase inverter is electrically connected to an input clock signal end, an output end of the first phase inverter is electrically connected to a first input end of the fourth OR gate, and a second input end of the fourth OR gate is electrically connected to a positive-phase output end of the RS trigger;
a first input end of the fifth OR gate is electrically connected to the positive-phase output end of the RS trigger, and a second input end of the fifth OR gate is electrically connected to the input clock signal end;
an input end of the second phase inverter is electrically connected to an output end of the fourth OR gate, and an input end of the third phase inverter is electrically connected to an output end of the fifth OR gate;
the third level switching circuit is electrically connected to an output end of the second phase inverter, and configured to switch a level of a signal from the output end of the second phase inverter to acquire a first output control signal and provide the first output control signal to the P-type driving circuit;
the P-type driving circuit is configured to provide the first output control signal to the $n^{th}$ first output control end;
the fourth level switching circuit is electrically connected to an output end of the third phase inverter, and configured to switch a level of a signal from the output end of the third phase inverter to acquire a second output control signal and provide the second output control signal to the N-type driving circuit; and
the N-type driving circuit is configured to provide the second output control signal to the $n^{th}$ second output control end.

18. The clock signal generation circuit according to claim 16, wherein:
the first output module comprises a first output transistor, and the second output module comprises a second output transistor;
a control electrode of the first output transistor is electrically connected to the $n^{th}$ first output control end, a first electrode of the first output transistor is electrically connected to a high voltage end via a first resistor, and a second electrode of the first output transistor is electrically connected to the $n^{th}$ clock signal output end; and
a control electrode of the second output transistor is electrically connected to the $n^{th}$ second output control end, a first electrode of the second output transistor is electrically connected to the $n^{th}$ clock signal output end, and a second electrode of the second output transistor is electrically connected to a low voltage end via a second resistor.

19. The clock signal generation circuit according to claim 18, wherein the first output transistor is a P-channel Metal Oxide Semiconductor (PMOS) transistor, and the second output transistor is an N-channel Metal Oxide Semiconductor (NMOS) transistor.

20. A display device, comprising the clock signal generation circuit according to claim 16.

* * * * *